United States Patent [19]

Sherman et al.

[11] 4,093,547
[45] June 6, 1978

[54] MAGNETICALLY COUPLED AQUARIUM FILTER

[75] Inventors: Robert M. Sherman, Beverly Hills; Charles O. Fuerst, Simi Valley, both of Calif.

[73] Assignee: Aquaria, Inc., Van Nuys, Calif.

[21] Appl. No.: 760,590

[22] Filed: Jan. 19, 1977

[51] Int. Cl.² ............................................. E04H 3/16
[52] U.S. Cl. ................................... 210/169; 210/249; 248/215
[58] Field of Search ....................... 210/169, 416, 249; 119/3; 248/94, 309, 215

[56] References Cited

U.S. PATENT DOCUMENTS

| | | | |
|---|---|---|---|
| 3,273,717 | 9/1966 | Canterbury | 210/169 |
| 3,321,081 | 5/1967 | Willinger | 210/169 |
| 3,392,836 | 7/1968 | Willinger | 210/169 |
| 3,477,679 | 11/1969 | Loutz | 210/169 X |
| 3,511,376 | 5/1970 | Sesholtz | 210/169 |
| 3,512,646 | 5/1970 | Willinger | 210/169 |
| 3,516,543 | 6/1970 | Willinger | 210/169 |
| 3,738,494 | 6/1973 | Willinger et al. | 210/169 |

*Primary Examiner*—Theodore A. Granger
*Attorney, Agent, or Firm*—Spensley, Horn & Lubitz

[57] ABSTRACT

A filter apparatus for aquariums consisting of two separable units. Within a filter unit is located the water filtering means and a pump for circulating the water from the aquarium through the filter means and back to the aquarium. Mounted upon a power unit is a motor having an output shaft which at one end is provided with a magnet. The power unit and filter unit are both hung from the rim of a wall of the aquarium by means of interlocking lip structures. The units are constructed such that the filter unit is seated in a "nesting" fashion upon the power unit, thus the power unit and filter unit are positioned in close proximity to one another and maintained in proper alignment such that the magnetic field of the magnet on the motor shaft magnetically influences a flywheel of the water pump and causes the latter to pump water when the motor is energized.

Because of the "nesting" relationship between the filter unit and the power unit, the filter unit may be serviced merely by lifting it away from the power unit which retains its hanging position on the aquarium rim. Replacement of the serviced filter unit is effected by simply returning the filter unit to its original hanging position. Proper alignment is insured by the "nesting" construction. Thus, to service the filter unit, the power unit need not be disturbed, unless repair thereof is required or unless the aquarium is to be moved to another location.

6 Claims, 7 Drawing Figures

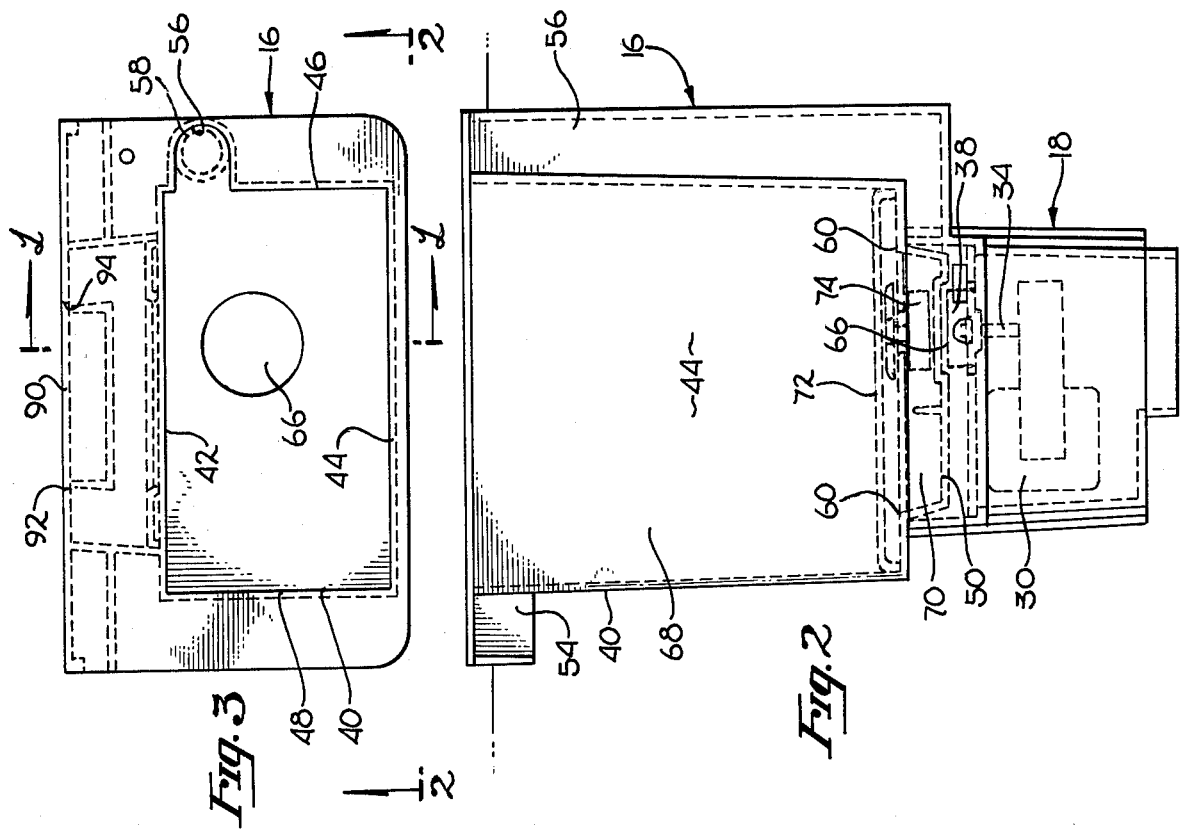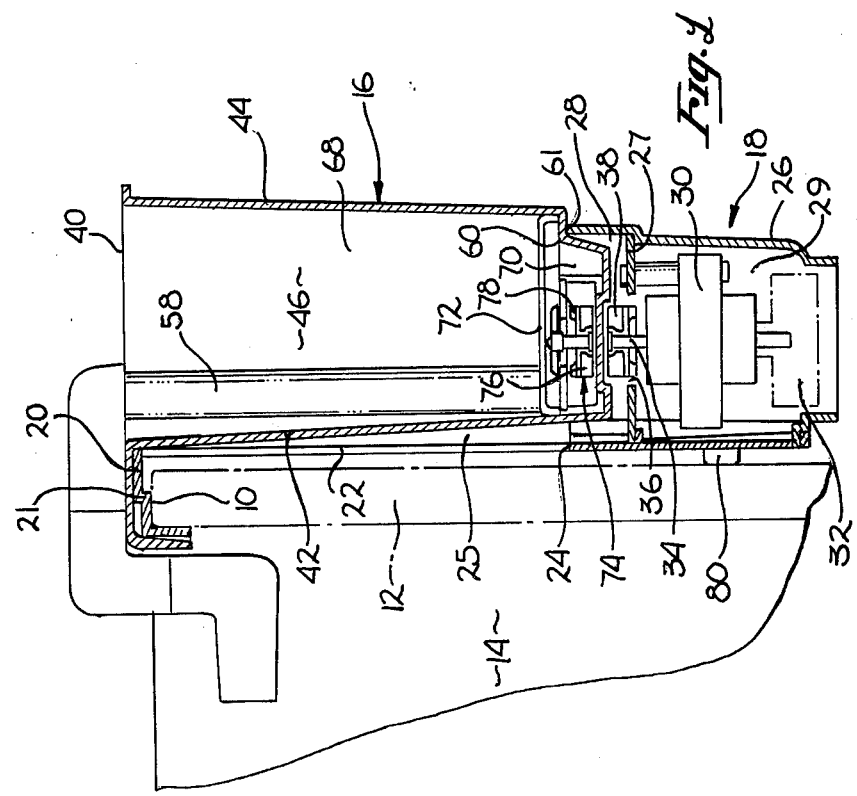

MAGNETICALLY COUPLED AQUARIUM FILTER

BACKGROUND OF THE INVENTION

1. Field of Invention

This invention relates to the field of construction of filter units for home aquariums.

2. Description of the Prior Art

Cleaning or other servicing of an aquarium filter ordinarily involves removal of the various component parts of the filter such as the motor, the pump and the filter material from the aquarium, and for convenience, the motor must usually be disconnected from the power socket. The present invention greatly simplifies such chores, thereby encouraging their performance more often, with the result that the cleanliness of the aquarium water is more easily maintained.

The use of magnetic coupling to transmit power is not novel. Such devices have been used in automobile speedometers, lunch counter juice dispensers and other devices as shown in the following U.S. Pat. Nos. Jacobs, Nos. 2,745,641 and 3,119,531; Mould, 3,045,134; Rankin, 2,638,588; Fay 591,395; Cassassa, 2,951,447; Schug, 2,366,562; Akulitch, 2,669,668; Baratz, 3,172,464; and Tabor, 1,982,971. Magnetic coupling has also been used in aquarium pumping and filtering devices as shown by Canterbury U.S. Pat. No. 3,273,717, and Willinger, U.S. Pat. Nos. 3,392,836; 3,512,646 and 3,321,081.

The Jacobs and Mould patents dealt with pumping fruit juices and similar beverages; Rankin involved deep well pumps and power transmission arrangements; Fay and Cassassa referred to gas and fuel pumps; Schug shows a refrigeration unit; Akulitch shows such a device used in chemical and dairy pumps, and Baratz and Tabor dealt with centrifugal pumps generally.

Similarly, the use of an open tank, raising water by siphon, filtration by charcoal or activated carbon and employing gravity for filtration are in common use.

A device manufactured by the Ralph Hagen U.S.A. Corporation some years ago is also pertinent. This device was the subject of the case of *Metaframe Corp. v. Biozonics Corp.*, 176 U.S.P.Q. 237.

Only those above devices dealing with aquarium filters and pumps will be discussed below.

The device of Canterbury U.S. Pat. No. 3,273,717 employs a sealed cylindrical filtration receptacle supported from the rim of one side of an aquarium, inside the filtration receptacle is located a hollow cylindrical filter. The aquarium water is passed through the walls of this cylindrical filter for removal of particles. Further, in one embodiment of the device of Canterbury, the motor unit is supported by the filter receptacle such that the filter receptacle cannot be removed from the aquarium without also removing the motor unit. In another embodiment, the motor unit is provided with legs and stands on a firm footing in an independent housing designed to accept the lower end of the filter receptacle (See FIG. 7 of Canterbury patent). The advantages of the present invention over the device of Canterbury will become apparent later in this specification.

In Willinger U.S. Pat. No. 3,321,081 is disclosed an aquarium filtration system similar to the present invention, however, in Willinger as in Canterbury, the motor unit is mounted upon and supported by the filtration unit. Also in Willinger U.S. Pat. No. 3,321,081, the tube which returns the clean water to the aquarium is not located in a recess in the side of the filtration receptacle and would interfere somewhat with convenient cleaning or changing of the filter material. These same comments apply to Willinger U.S. Pat. Nos. 3,512,646 and 3,392,836. Moreover, the claims of the U.S. Pat. No. 3,512,646 device are directed to the rotor device (claim 1) and a bearing means comprising a ball and other items (claim 2); and the claim of the U.S. Pat. No. 3,392,836 device is directed to a heat transfer relationship between the water and pump motor unit.

The advantages and improvements of the present invention over these prior art devices will become apparent from an inspection of the accompanying drawings and description.

SUMMARY OF THE INVENTION

The invention can be simply summarized as the combination with a conventional open-topped household aquarium of (a) a power unit that houses a power motor having a driven shaft to which a disc-like magnet is affixed, said power unit having a hanger portion that, at its upper end, is formed to have hooking engagement with the top rim of the aquarium whereby said power unit may be hooked over said aquarium rim to hang in operative position and be readily removed therefrom; (b) a filter unit comprising a preferably non-metallic open-topped container formed at its upper end to have hooking engagement over either the upper rim of an aquarium or the hanger portion of the power unit or both; (c) a pump, disposed in said non-metallic container, comprising a vaned disc or flywheel that is disposed in the magnetic field of the magnet which is driven by the power motor, said flywheel thereby constituting the rotor of said pump to circulate aquarium water from the aquarium through filter means disposed in the mentioned non-metallic container; (d) interengaging means between the power unit and filter unit to so locate the magnetic field of the power motor magnet and the magnetic field of the pump flywheel as to prevent relative lateral displacement of the magnetic field of the motor and of the pump but allowing easy removal of the filter unit without disturbing the power unit.

This invention has for its objects to provide such means that are positive in operation, convenient in use, easily installed in a working position and easily disconnected therefrom, economical of manufacture, relatively simple, and of generally superior serviceability.

The invention also comprises novel details of construction and novel combinations and arrangements of parts, which will more fully appear in the course of the following description, which is based on the accompanying drawings. However, said drawings merely show, and the following specification merely describes, one embodiment of the present invention, which is given by way of illustration or example only.

BRIEF DESCRIPTION OF THE DRAWINGS

FIG. 1 is a vertical sectional view of the present aquarium filter, the same being taken on the line 1—1 of FIG. 3.

FIG. 2 is a side view of the filter as taken on line 2—2 of FIG. 3.

FIG. 3 is a top plan view of the portion of the filter that is shown in FIG. 2.

Figure 4:
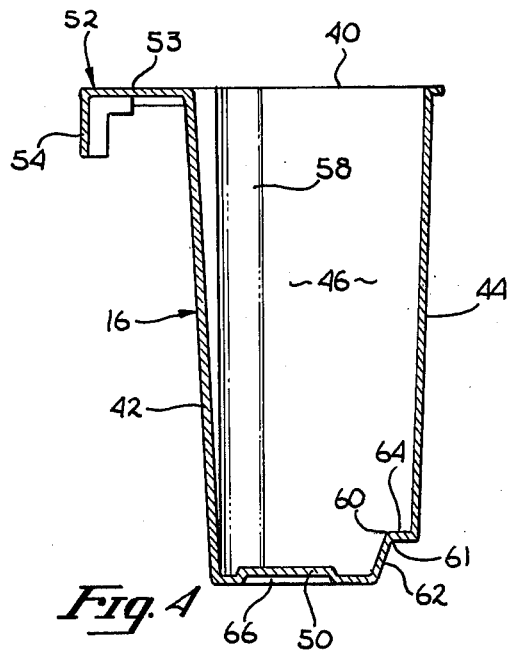
FIG. 4 is a sectional view of the filter unit taken along the line 1—1 of FIG. 3.
Figure 5:
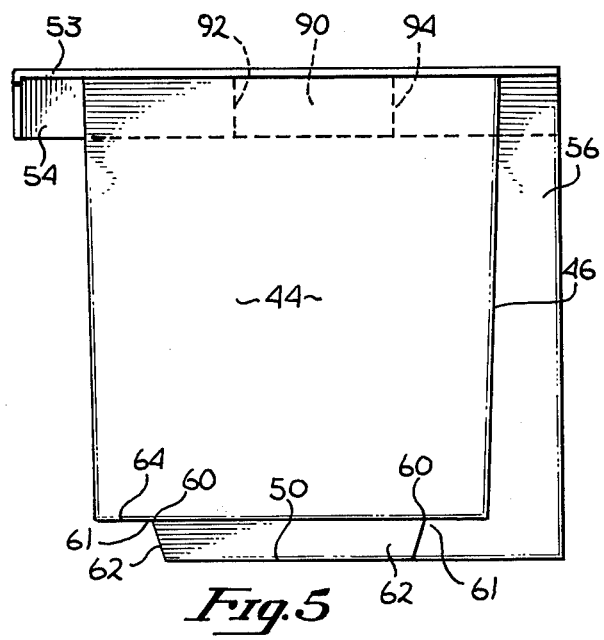
FIG. 5 is a side view of the filter unit taken along the line 2—2 of FIG. 3.
Figure 6:
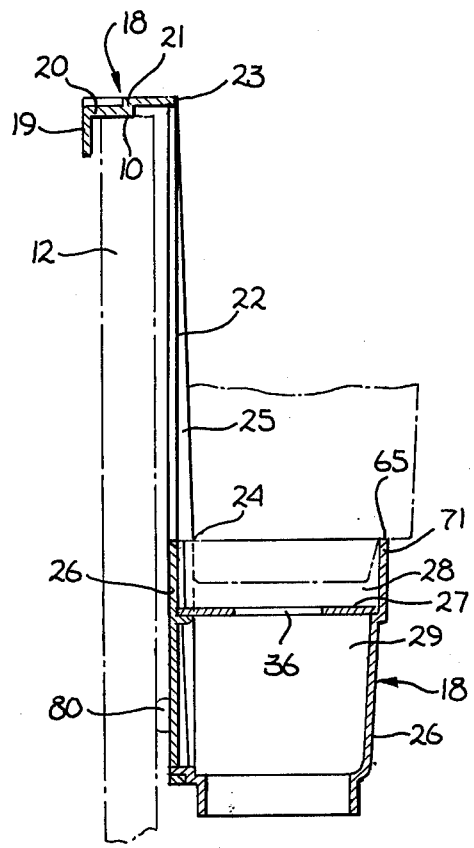
FIG. 6 is a sectional view of the motor unit taken along the line 1—1 of FIG. 3.
Figure 7:
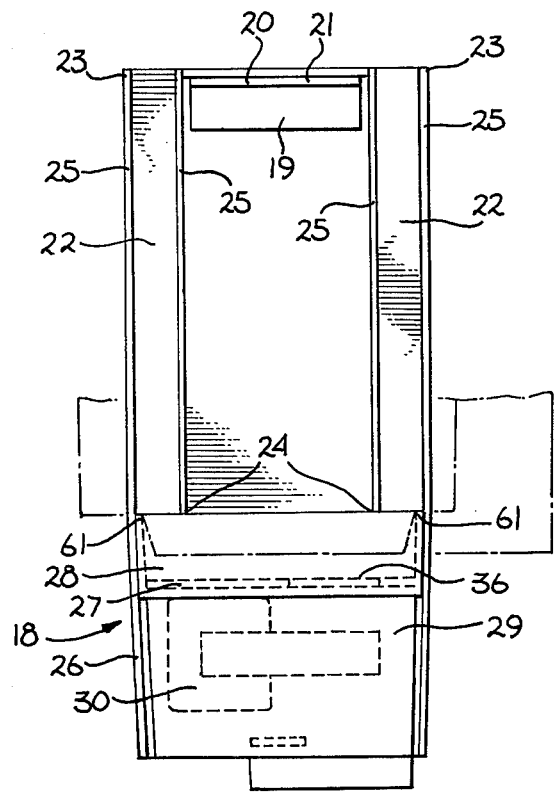
FIG. 7 is a side view of the motor unit taken along the line 2—2 of FIG. 3.

It is to be noted that the unit of FIG. 4 can be seated into the unit of FIG. 6 as illustrated in FIG. 1, and similarly, the unit of FIG. 5 can be interconnected with the unit of FIG. 7 as illustrated in FIG. 2.

DESCRIPTION OF THE PREFERRED EMBODIMENT

The filter apparatus that is illustrated in the figures is shown as being removably hung from the rim 10 of one of the vertical walls 12 of an aquarium tank 14.

The filter apparatus comprises, generally, a filter unit 16, and a power unit 18, both separably hung from the aquarium rim 10, or from each other in a manner later described, which allows for bodily removal of the filter unit 16 from operable engagement with the power unit 18 without in any way disturbing the position of the latter unit on the aquarium rim 10.

As shown in FIG. 1 and in FIGS. 6 and 7, the power unit 18 comprises a hanger lip 20, two vertical connecting members 22, and a housing 26. The hanger lip 20 is formed to have hooking engagement with the rim 10 of the aquarium tank in a manner that allows upward movement of the unit 18. The lip 20 is also formed with a discontinuity 21 in its surface so as to accomodate both thick (about 1 inch) and thin (about ½ inch) aquarium rims, and has a downward extending portion 19 which hooks the power unit 18 over the aquarium rim 10.

The hanger lip 20 joins the two upper ends 23 of the vertical connecting members 22, which connect the hanger lip 20 and the housing 26. The vertical connecting members are best illustrated in FIGS. 6 and 7 and have a cross section which gradually changes from rectangular at the top 23, to a cross section of a squared C (i.e. [ ) at the bottom 24, as the ribs 25 gradually increase in depth. These ribs 25 give additional strength and rigidity to the vertical connecting members 22. The bottom ends 24 are connected to and support the housing 26.

Housing 26 is divided into two portions by flooring 27, forming an upper recess 28 and a lower compartment 29. Within the lower compartment 29 are mounted a motor 30 and a fan 32. The drive shaft 34 of the motor extends through hole 36 in flooring 27 and mounted on the end of the drive shaft is a disc shaped magnet 38. The upper recess 28 of the housing 26 is dimensioned so as to be able to receive the filter unit 16 as described below.

The filter unit 16 illustrated in FIGS. 1 through 5 comprises a container 40 defined by opposite side walls 42 and 44 and opposite end walls 46 and 48, and bottom 50. The filter unit 16 has a lip structure 52 comprised of a horizontal extension 53 of container 40 and a downward extending vertical member 54 attached to the horizontal extension 53 as shown in FIGS. 4 and 5. Member 54 may be provided with a notch 90 as shown in FIGS. 3 ad 5 defined by vertical edges 92 and 94, the length and depth of the notch being dimensioned to receive and thereby interlock with the vertical member 19 of the lip 20 of the power unit 18. The lip structure 52 is dimensioned to have hooking engagement with the corresponding lip structure of the power unit 18 and/or the rim 10 of the aquarium. End wall 46 of the filter unit is provided with a recess 56 which serves to locate the water return tube 58 (see FIG. 3) so that it does not interfere with changing of the filter bed material (not shown). The bottom 50 of the container 40 is formed so as to provide a step 60 having sides 62 and 64 and also provides for a circular recess 66 as shown in FIG. 4. The step 60 extends on the interior of container 40 around three of the sides of container 40, specifically the sides defined by walls 44, 46 and 48. Corresponding to the interior step 60, sides 62 and 64 also define a seat 61 around the exterior of container 40. Container 40 is divided into an upper section 68 and a lower section 70 by a perforated screen 72. (See FIGS. 1 and 2). The bed of filter materials (not shown) is placed on top of screen 72. In the lower section 70 is mounted a pump 74. The pump consists of a rotatable disc shaped magnet portion 76, integrally constructed with pump vanes 78 on its upper surface. This pump 74 is mounted in section 70 such that the magnet portion 76 is in close proximity to bottom 50 and axially aligned with the circular recess 66.

The aquarium water which is drawn into container 40 by siphon means filters down through the bed of filter material (not shown) through the perforated screen 72 into lower section 70 where the pump 74 provides the energy to return the filtered water to the aquarium 14 through the return tube 58.

The above described power unit 18 and filter unit 16 are assembled upon a wall 12 of the aquarium to form a filter apparatus. The power unit 18 is placed in hooking engagement with the rim 10 of the aquarium, the hanger lip 20 engaging the surface of the rim 10. The housing 26 being slightly spaced from wall 12 by means of spacers 80 fastened to the housing as illustrated in FIGS. 1 and 6.

The filter unit 16 is placed upon the power unit 18 such that the lip structure 52 hooks over the hanger lip 20 of the power unit. The vertical member 54 of the lip structure having a notch or other suitable means for receiving and interlocking with the vertical portion 19 of the hanger lip 20 of the power unit. This interlocking feature insures that the lip structure 52 and the hanger lip 20 are consistently assembled in the same relative position. Assembly of the filter apparatus also brings the side wall 42 into contact with ribs 25 as shown in FIG. 1 and in addition aligns step 60 with the rim 65 of the walls 71 of the upper recess 28. (See FIGS. 4 and 6). Proper alignment is assured by proper dimensioning and the slope of surfaces 62.

The assembly procedure thus illustrated demonstrates the "nesting" feature of the filter unit 16 and power unit 18. The step 60 nests the filter unit with the upper recess 28 of the power unit 18. This nesting insures that the hole 36 is accurately aligned beneath recess 66. Thus, the disc shaped magnet 38 on the end of drive shaft 34 extends upward and within recess 66 as shown in FIGS. 1 and 2.

In the above-described manner, it is deemed clear that the filter unit 16 may be removed from the position shown in FIG. 1 for servicing of its filter material without disturbing the position of the power unit.

In the particular embodiment illustrated in the figures, the housing 26 of the power unit 18 is structured such that the portion of the housing presented to the filter unit 16 serves as a receptacle for the portion of the filter unit facing the power unit. This arrangement functions best when the power unit 18 is below the filter unit 16. The present invention, however, is not intended to be limited to such a configuration and contemplates that in particular applications it may be preferable to mount the filter unit and power unit side by side rather than one above or below the other. The only limitation on the relative location of the units is that the disc magnet 38 on the drive shaft 34 be located within the effective area of the magnetic field of the magnet 76 of the pump 74 such that power can be transmitted from the motor 30 by the interaction of the magnetic fields to operate the pump 74. The location of the pump 74 is not restricted to the bottom of the filter unit 16, but may be located so that the magnetic field of magnet 76 passes through any wall of container 40 as the circumstances dictate. Similarly, the location of the motor 30 is not limited to a vertical orientation of its drive shaft 34, any orientation which insures interaction of the magnetic fields and transmission of power is acceptable.

From time to time, it is necessary to replace the filter materials (not shown) in the container 40. Since the water return tube 58 is located within recess 56 of wall 46, (or any other convenient wall) as discussed above, and since the filter unit and power unit are nested, it is clear that the bed of filter materials can be removed and replaced with minimal effort. The filter unit 16 is merely lifted to an area where the bed of filter materials can be conveniently replaced. The filter unit is then returned to its operative engagement with the power unit. An additional advantage of locating the return tube 58 within recess 56 is that this configuration facilitates the use of a horizontally oriented filter. This means the water from the aquarium flows downward through the filter material. The water flow in this configuration is much more uniform and predictable than if the water was required to flow horizontally through a vertically oriented filter material. No tools are required to change the filter material, the aquarium is not disturbed, the power unit is not disturbed and no power cord interferes with the procedure. The servicing is accomplished quickly and simply.

While the invention has been particularly shown and described with reference to a preferred embodiment thereof, it will be understood by those skilled in the art that various changes in form and details therein may be made without departing from the spirit and scope of the invention.

What is claimed is:

1. In a filter apparatus for use with a home-type aquarium having a wall defining a rim, said filter apparatus having:
   a power unit having a housing, a motor having a drive shaft and a first magnet member mounted on said shaft, said motor being mounted within said housing, and hanger means attached to said housing for hanging said power unit on a rim of an aquarium wall so as to suspend said power unit from an aquarium wall, said hanger means extending upwardly and including a hook-shaped member for hooking engagement over an aquarium wall rim,
   a separate filter unit, means for mounting said filter unit in close proximity to said power unit, said filter unit comprising a container, a pump housed in the lower portion of said container, said pump having a second magnet member to be rotated by the magnetic field of said first magnet member for the rotation of the pump impeller; the improvement comprising:
   said means for mounting said filter unit with respect to said power unit includes an upward facing edge defined by the exterior surface of said hook-shaped member for hanging said power unit, hanger means mounted on said filter unit container for removable engagement with said upward facing edge of said hook-shaped member, said hanger means constructed and arranged for interlocking hooking engagement with said upward facing edge, and means mounted on said power unit housing for engaging the lower end of said separate filter unit container for providing accurate alignment of said first and second magnet members for transmitting power from said first magnet member to said second magnet member to drive said pump whereby said filter unit mounting means provides for removal of said separate filter unit without disturbing said power unit and the filter unit may be serviced by lifting it away from the power unit allowing it to retain its position on an aquarium rim.

2. The invention of claim 1, wherein said hanger means mounted on said filter unit container defines a notch for interlocking hooking engagement over said upward facing edge defined by the exterior surface of said hook-shaped member of said power unit hanger means.

3. The invention of claim 1, wherein said means mounted on said power unit housing for engaging the lower end of said separate filter container is a receptable defined by the exterior surface of sid power unit housing.

4. The invention of claim 3, wherein said lower end of said separate filter unit container defines an exterior seat dimensioned to interface with said receptacle.

5. The invention of claim 4, wherein said exterior seat is formed by a step formed on the interior of said separate filter unit container.

6. The invention of claim 5, wherein said separate filter unit has a perforated screen member mounted within said container and above said pump, said filter unit container has an upwardly extending wall defining a recess within which is mounted a means for returning filtered aquarium water to an aquarium from said pump, said recess being located outside of the vertical space extending above said perforated screen member, whereby said screen member may be lifted from said filter unit container during servicing of said separate filter unit.

* * * * *